United States Patent Office 3,346,520
Patented Oct. 10, 1967

3,346,520
PROCESS FOR MAKING HIGH IMPACT STYRENE
POLYMERS IN AQUEOUS SUSPENSION
Lieng-Huang Lee, Midland, Mich., assignor to The Dow
Chemical Company, Midland, Mich., a corporation of
Delaware
No Drawing. Filed Jan. 25, 1965, Ser. No. 427,972
5 Claims. (Cl. 260—17)

This invention relates to the preparation of high impact styrene polymers. It pertains especially to improvements in a process and agents for recovering the styrene polymer in bead form from an aqueous suspension polymerization process.

It is known to prepare high impact styrene polymers in bead or granular form by partially polymerizing a solution of a rubbery butadiene polymer dissolved in a vinylidene aromatic monomer such as styrene or a mixture of sytrene and acrylonitrile, until the solution contains from about 25 to 30 percent by weight of polymer, and to thereafter complete the polymerization of the monomer by heating the partially polymerized solution in an aqueous suspension containing a water-soluble dispersing agent.

Among water-soluble dispersing agents known to the art there may be mentioned alkali metal salts of sulfonated polystyrene, sulfonated polyvinyltoluene, polyacrylic acid, polymethacrylic acid, interpolymers of acrylic acid or methacrylic acid and 2-ethylhexylacrylate, or carboxyalkyl alkyl celluloses, e.g. carboxymethyl methyl cellulose.

In completing polymerization of the monomers in partially polymerized solutions comprising a butadiene rubber and a vinylidene aromatic monomer to obtain high impact styrene polymer in bead or granular form, it has been observed that oftentimes the aqueous medium consists of results in the formation of large quantities of foam which renders it difficult to separate the aqueous liquid from the polymer and requires an abundant supply of pure or substantially pure water in order to wash or free the polymer from the dispersing agent.

Accordingly, it is a primary object of the invention to provide a process and agents for causing the receding of foam with resultant ease of separating of the aqueous liquid from the polymer particles in the aqueous suspension polymerization of a solution of rubber and a vinylidene aromatic compound to form a high impact styrene polymer in the presence of a water-soluble dispersing agent. Other and related objects will become apparent from the following description of the invention.

According to the invention, the receding of foam with resultant ease of separating of the polymer particles from the aqueous liquid and freeing of the polymer from the dispersing agent can readily be obtained in an aqueous suspension system employing a water-soluble organic substance, e.g. a carboxyalkyl alkyl cellulose, as the dispersing agent for the making of a high impact styrene polymer by completing the polymerization of the monomers of a partially polymerized solution of a rubbery butadiene polymer dissolved in a monomer comprising a vinylidene aromatic hydrocarbon and not more than, i.e. from 0 to 35, weight percent of acrylonitrile in aqueous suspension by adding to the suspension after the polymerization is complete or substantially complete, from 0.01 to 1, preferably from 0.01 to 0.1, percent by weight of a polypropylene glycol having an average molecular weight between 1200 and 4000, preferably from 1200 to 2000.

The high impact styrene polymers can consist of from about 2 to about 20 percent by weight of a rubbery butadiene polymer having a Mooney number between 1 and 100, such as homopolymer of butadiene, or a rubbery copolymer of styrene and butadiene, and correspondingly of from 98 to about 50 percent by weight of a vinylidene aromatic hydrocarbon such as styrene, vinyltoluene, vinylxylene, alpha-methylstyrene wherein from 0 to 35 percent by weight of the vinylidene aromatic hydrocarbon can be replaced with acrylonitrile, the sum of the weights of said rubbery butadiene polymer and said monomers being 100 percent.

The suspending or dispersing agent can be any of a variety of water soluble dispersing agents known to the art, such as polyacrylamide, methyl cellulose, hydroxy ethyl cellulose, or alkali metal salts of sulfonated polystyrene or sulfonated polyvinyltoluene, polyacrylic acid or water soluble interpolymers of acrylic acid or methacrylic acid and 2-ethylhexylmethacrylate, or carboxymethyl methyl cellulose. The alkali metal salts, e.g. the sodium or potassium salts, of carboxymethyl methyl cellulose such as a cellulose derivative having an average of about 0.25 —OCH$_2$COOH group and about 1.8 OCH$_3$ groups per mole of cellulose (Methocel CAM), is preferred and is advantageously employed as the dispersing agent in carrying out the aqueous suspension polymerization, since the alkali salts of such cellulose derivative do not tend to gel upon heating at elevated temperatures. The carboxymethyl methyl cellulose or alkali metal salt thereof should have a viscosity of from about 1000 to 3000 centipoise as determined for a 2 weight percent solution of the material in water at 25° C. Said material can be used in amounts corresponding to from about 0.2 to 5, preferably from 0.25 to 2.5 percent by weight of the water used.

In general, an amount of the aqueous medium corresponding to from one to two times the volume or weight of the prepolymerized solution starting material is usually employed, although smaller or larger quantities of the aqueous liquid can be used.

The suspension polymerization can be carried out by heating the materials at temperatures between 80° and 180° C., while having the partially polymerized solution suspended as droplets in the aqueous medium and at superatmospheric pressures at least as great as the autogeneous pressure of the mixture, e.g. by heating the same in a closed vessel, preferably in the absence or substantial absence of air or oxygen. Higher pressures may be used such as by pressurizing the vessel containing the aqueous suspension with an inert gas, e.g. nitrogen, methane, helium, or argon, suitably at from 5 to 100 pounds per square inch gauge pressure or higher, prior to heating the materials, to complete the polymerization.

After completing or substantially completing polymerization of the monomers, the polypropylene glycol antifoam agent is added to the mixture to depress the foam. Thereafter the polymer is recovered in usual ways, e.g. it is separated by filtering and is washed with water and dried. In a preferred embodiment, the recovered polymer is devolatilized by feeding the same to a plastics extruder wherein it is heated to a molten condition and is subjected to subatmospheric pressure, i.e. it is passed in molten condition through a section of the extruder wherein volatile ingredients are vaporized and removed from the polymer under vacuum, then it is extruded as a thin sheet or as a plurality of strands which are cooled and cut to a granular form suitable for molding.

The following examples illustrate ways in which the principle of the invention has been applied, but are not to be construed as limiting its scope.

*Example 1*

In each of a series of experiments, 50 cc. of an aqueous 1 weight percent solution of the sodium salt of carboxymethyl methyl cellulose, having an average of about 0.25 —OCH$_2$COOH group and about 1.8 —OCH$_3$ groups per mole of cellulose, which carboxymethyl methyl cellulose contained 52% by weight active cellulose derivative and was Methocel CAM, was placed in a 100 ml. test tube and was vigorously shaken. The tube was filled with foam. Thereafter, there was added to the foamed material 1 drop of a polypropylene glycol having an average molecular weight as stated below. The time for the foam to be dispersed was observed. The results of the experiments, the molecular weight of the polyglycol used, and the time in seconds for the foam to disappear or recede after adding of the polyglycol to the solution were as follows:

| Run No. | Polyglycol | Time, sec. |
|---------|------------|------------|
| 1       | P-1200     | 25         |
| 2       | P-2000     | 55         |
| 3       | P-3000     | 65         |
| 4       | P-4000     | 75         |

*Example 2*

A solution of 10 parts by weight of "Diene" rubber (polybutadiene rubber consisting of over 90 percent 1,4 addition and only 7.5 percent vinyl structure, the cis-1,4 configuration comprising 32 to 35 percent of the polymer), which polybutadiene rubber had a Mooney number of ML 1+4 at 212° F. of 35 and was of narrow molecular weight distribution, dissolved in 65 parts by weight of monomeric styrene and 25 parts by weight of acrylonitrile, was stirred and heated in mass at a temperature of 105° C. for a period of 45 minutes, then was stirred and heated at a temperature of 115° C. for 2 hours longer. The partially polymerized solution contained 28 weight percent of polymer solids.

A charge of 100 parts by weight of the partially polymerized solution, together with 0.02 percent by weight of di-tert.-butyl peroxide as polymerization catalyst or initiator and 0.02 percent by weight of 2,6-di-tert.-butyl-4-methylphenol as antioxidant and/or stabilizing agent, was placed in a polymerization vessel containing 100 parts by weight of an aqueous one weight percent solution of sodium carboxymethyl methyl cellulose, "Methocel CAM". The resulting mixture was stirred and heated in the closed vessel to polymerize the monomer in aqueous suspension under time and temperature conditions as follows: 4 hours at 135° C.; 4 hours at 140° C.; and 2 hours at 150° C. Thereafter, the vessel was cooled to room temperature and was opened. The vessel was filled with foam in the free space above the liquid-polymer bead mixture. A charge of 0.05 percent by weight of polypropylene glycol having an average molecular weight of 1200, "P1200" was added to the vessel. The foam rapidly dispersed or receded. Thereafter the polymer beads were readily separated from the liquid, were washed with water, and were dried.

In the absence of the polypropylene glycol P1200, the liquid and foam were extremely difficult to separate and wash from the polymer beads. It required large volumes of wash water to free the polymer from the foam. Similar results are obtained when the partially polymerized solution is prepared from a solution of 4 to 10 weight percent of "diene" rubber and correspondingly from 96 to 90 weight percent of styrene.

*Example 3*

The experiment of Example 2 was repeated, except that a charge of 0.025 percent by weight of polypropylene glycol, P1200, was added to the foam and mixture in the polymerization vessel. The foam rapidly receded. The polymer was easily separated from the liquid and was readily washed free from residues of said liquid.

*Example 4*

The experiment of Example 2 was repeated, employing a partially polymerized solution of 13 percent by weight of "diene" rubber, 63.5 percent styrene and 23.5 percent acrylonitrile, which partially polymerized solution contained 30 percent by weight of polymer solids. The prepolymerized solution was finished off in aqueous suspension using 0.015 percent by weight of di-tert.-butyl peroxide as catalyst and heating of the suspension for 4 hours at 135° C.; and 6 hours at 150° C. Thereafter, 0.05 percent of polypropylene glycol, P1200 was added to kill the foam. The polymer was separated by filtering and was washed with water and was dried.

Similar results are obtained when polypropylene glycols of 2000, 3000 and 4000 molecular weights are employed in place of the polypropylene glycol of 1200 average molecular weight used in the examples, it being understood that receding of the foam is somewhat slower when using the higher molecular weight polypropylene glycols as hereinbefore said.

I claim:
1. In a process for making a high impact rubber reinforced styrene polymer wherein a solution of from about 2 to 20 weight percent of a rubbery butadiene polymer dissolved in from 98 to 50 weight percent of at least one monovinyl aromatic hydrocarbon of the benzene series and from 0 to 30 weight percent of acrylonitrile, is partially polymerized by heating the solution in mass until said solution contains from about 25 to 30 percent by weight of polymer solids, then is further polymerized by heating said partially polymerized solution in an aqueous suspension containing an alkali metal salt of a water-soluble organic dispersing agent until polymerization of the monomer is substantially complete and solid polymer particles are obtained, the improvement which comprises adding to the mixture, after completing said polymerization, from 0.01 to 1 percent, based on the weight of the polymer in the aqueous suspension, of a polypropylene glycol having an average molecular weight between 1200 and 4000 and thereafter separating the liquid from the polymer.

2. A process as claimed in claim 1, wherein the water-soluble organic dispersing agent is carboxymethyl methyl cellulose.

3. A process as claimed in claim 1 wherein the polypropylene glycol is polypropylene glycol having an average molecular weight of 1200.

4. A process as claimed in claim 1 wherein the partially polymerized solution is prepared from a solution of from about 10 weight percent of polybutadiene consisting of at least 90 percent of 1,4-addition with not more than 10 percent of vinyl structure and at least 30 percent of cis-1,4 configuration, from about 65 percent by weight of styrene and about 25 percent of acrylonitrile.

5. A process as claimed in claim 1 wherein the partially polymerized solution is prepared from a solution of about 10 weight percent of polybutadiene and about 90 weight percent of styrene.

No reference cited.

WILLIAM H. SHORT, *Primary Examiner.*

J. NORRIS, *Assistant Examiner.*